United States Patent
Aono et al.

(10) Patent No.: US 10,852,218 B2
(45) Date of Patent: Dec. 1, 2020

(54) SAMPLE INTRODUCTION DEVICE

(71) Applicant: SHIMADZU CORPORATION, Kyoto (JP)

(72) Inventors: Akira Aono, Kyoto (JP); Isao Sawamura, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 212 days.

(21) Appl. No.: 15/778,355

(22) PCT Filed: Dec. 15, 2015

(86) PCT No.: PCT/JP2015/085120
§ 371 (c)(1),
(2) Date: May 23, 2018

(87) PCT Pub. No.: WO2017/104005
PCT Pub. Date: Jun. 22, 2017

(65) Prior Publication Data
US 2018/0356316 A1    Dec. 13, 2018

(51) Int. Cl.
| G01N 1/22 | (2006.01) |
| G01N 30/16 | (2006.01) |
| G01N 30/54 | (2006.01) |
| G01N 1/40 | (2006.01) |
| G01N 35/04 | (2006.01) |
| G01N 1/44 | (2006.01) |
| G01N 30/46 | (2006.01) |
| G01N 30/12 | (2006.01) |

(52) U.S. Cl.
CPC ........... *G01N 1/2247* (2013.01); *G01N 1/405* (2013.01); *G01N 1/44* (2013.01); *G01N 30/16* (2013.01); *G01N 30/465* (2013.01); *G01N 30/54* (2013.01); *G01N 35/04* (2013.01); *G01N 2030/128* (2013.01)

(58) Field of Classification Search
CPC ...... G01N 1/2247; G01N 1/405; G01N 35/04; G01N 1/44; G01N 30/465; G01N 30/16; G01N 30/54; G01N 2030/128
See application file for complete search history.

(56) References Cited

U.S. PATENT DOCUMENTS 6,368,561 B1 * 4/2002 Rutishauser ............... B03C 1/30
422/527
2008/0148814 A1 * 6/2008 Bostrom .................. E21B 49/00
73/23.35

FOREIGN PATENT DOCUMENTS

JP    5648608 B2    1/2015

* cited by examiner

*Primary Examiner* — Xin Y Zhong
(74) *Attorney, Agent, or Firm* — Sughrue Mion, PLLC

(57) ABSTRACT

A sample introduction device includes a tube holding unit 10, a tube heating unit 20, and a movement mechanism 30. The tube holding unit 10 holds a sample tube 1. The tube heating unit 20 comes into contact with the sample tube 1 held in the tube holding unit 10 and heats the sample tube 1 to desorb sample components in the sample tube 1. The tube holding unit 10 and the tube heating unit 20 are attached to the movement mechanism 30 so as to be able to move separately. The movement mechanism 30 includes a nut 32 which can be attached to and detached from the tube holding unit 10 and the tube heating unit 20, and a support shaft 31 which supports the nut 32 such that the nut 32 can move.

7 Claims, 14 Drawing Sheets

SAMPLE INTRODUCTION DEVICE

TECHNICAL FIELD

The present invention relates to a sample introduction device for heating a sample tube containing a sample to desorb a sample component and to introduce the sample component into an analyzing unit.

BACKGROUND ART

For example, in the case of introducing trace amounts of sample components to an analyzing unit such as in the case of analyzing environmental pollutants in the air, a sample introduction device adopting a thermal desorption method may be used (for example, see Patent Document 1 below). In this type of sample introduction device, by heating the sample tube containing a sample to desorb sample components, the sample components are temporarily collected in a trap column. Then, by heating the sample components in the trap column, the sample components can be desorbed and introduced into the analyzing unit.

FIGS. 5A to 5C are plan views illustrating an exemplary configuration of a heating mechanism 200 of a sample tube 201 in a conventional sample introduction device. FIGS. 6A to 6C are side views of the heating mechanism 200 corresponding to FIGS. 5A to 5C, respectively.

The sample tube 201 is formed, for example, in a cylindrical shape. Before an analysis, as illustrated in FIG. 5A, both ends of the sample tube 201 are closed by caps 202 in a state where a sample is contained in the sample tube 201. The sample is contained in a state of being adsorbed on an adsorbent (not illustrated) provided in the sample tube 201. The heating mechanism 200 includes a tube holding unit 210 which holds the sample tube 201, a tube heating unit 220 which heats the sample tube 201, and a movement mechanism 230 to which the tube holding unit 210 is movably attached.

The movement mechanism 230 includes a rotatable support shaft 231 extending in a straight line along a horizontal direction. A screw thread is formed on the outer peripheral surface of the support shaft 231. A nut 232 is screwed onto the thread to be attached to the support shaft 231. The tube holding unit 210 holds the sample tube 201 such that the sample tube 201 extends perpendicularly to the support shaft 231 and in a horizontal direction. The nut 232 is fixed to the tube holding unit 210. Thus, in a case where the support shaft 231 is rotated, the tube holding unit 210 moves along the support shaft 231 in different directions according to the rotation direction of the support shaft 231.

The tube heating unit 220 has a configuration in which a heater block 221 and a support base 222 which supports the heater block 221 are integrally formed. The tube heating unit 220 is disposed in a state where the support shaft 231 penetrates the support base 222. Note that the support shaft 231 is not screwed into the support base 222. The support shaft 231 only penetrates the support base 222. Unlike the tube holding unit 210, the tube heating unit 220 does not move when the support shaft 231 rotates. Therefore, when the support shaft 231 is rotated in one direction, the tube holding unit 210 can be brought close to the tube heating unit 220. When the support shaft 231 is rotated in the reverse direction, the tube holding unit 210 can be separated from the tube heating unit 220.

On the side opposite to a tube heating unit 220 side with respect to the tube holding unit 210, a pressing unit 240 is provided for pressing and sandwiching the sample tube 201 held by the tube holding unit 210. When the sample tube 201 is set in the tube holding unit 210 in a state where the tube holding unit 210 is positioned at an initial position as illustrated in FIGS. 5A and 6A, first, the support shaft 231 is rotated to move the tube holding unit 210 to the pressing unit 240 side.

Thus, as illustrated in FIGS. 5B and 6B, the pressing unit 240 abuts against the outer peripheral surface of the sample tube 201, and the sample tube 201 is sandwiched between the pressing unit 240 and the tube holding unit 210. In this state, the caps 202 are removed from the both ends of the sample tube 201 by operating a cap attaching and detaching mechanism, not illustrated. At that time, it is possible to prevent the sample tube 201 from moving in the longitudinal direction due to pressing force of the pressing unit 240.

Then, the support shaft 231 is rotated, and thus the tube holding unit 210 moves to the tube heating unit 220 side as illustrated in FIGS. 5C and 6C. When the nut 232 abuts against the support base 222 of the tube heating unit 220 and stops, the sample tube 201 comes into contact with the heater block 221. At this position, pipes 203 for circulating a carrier gas in the sample tube 201 are connected to the both ends of the sample tube 201.

In this state, the heater block 221 is heated, and the carrier gas is circulated in the sample tube 201 via the pipes 203. As a result, sample components in the sample tube 201 are volatilized and desorbed, and the sample components delivered by the carrier gas from the sample tube 201 via the pipes 203 are collected in a trap column (not illustrated).

Thereafter, in the state as illustrated in FIGS. 5C and 6C, a cooling fan, for example, is used to cool the heater block 221 and the sample tube 201. After the sample tube 201 is sufficiently cooled, the trap column is heated and the carrier gas is supplied into the trap column. As a result, the sample components in the trap column are volatilized and desorbed. The carrier gas introduces the sample components into the analyzing unit.

At that time, part of the carrier gas containing the sample components is introduced into the sample tube 201 via the pipes 203. Since the sample tube 201 is sufficiently cooled, the sample components are recollected in the sample tube 201. As described above, by introducing only part of the sample components contained in the sample tube 201 into the analyzing unit and re-collecting the remaining sample components in the sample tube 201, the bandwidth of a detection peak can be narrowed.

However, in the conventional sample introduction device as described above, since the heater block 221 is in contact with the sample tube 201 as illustrated in FIGS. 5C and 6C during cooling of the sample tube 201, there is a problem that it takes time to cool the sample tube 201. That is, since the sample tube 201 to both ends of which the pipes 203 are connected cannot be moved along the support shaft 231 and the heater block 221 is also fixed, the sample tube 201 can be cooled only in a state where the heater block 221 having a large heat capacity is in contact with the sample tube 201.

FIG. 7 is a side view illustrating an exemplary configuration of a heating mechanism 300 of a sample tube 201 in another conventional sample introduction device. Identical reference signs are given to configurations similar to those of the examples illustrated in FIGS. 5A to 5C and FIGS. 6A to 6C, and a detailed description thereof will be omitted.

In this example, a tube heating unit 320 is configured to be movable. Specifically, the tube heating unit 320 has a configuration in which a heater block 321 and a support rod 322 which supports the heater block 321 are integrally formed. For example, the support rod 322 extends in the vertical direction and supports the heater block 321 at the lower end of the support rod 322.

A movement mechanism 230 includes a stopper 233 in addition to a support shaft 231 and a nut 232. When the support shaft 231 is rotated to move a tube holding unit 210 to a tube heating unit 320 side, the tube holding unit 210 abuts against the stopper 233 and thus the tube holding unit 210 stops. The heater block 321 is disposed above this position. By moving the support rod 322 in the vertical direction, the heater block 321 can be brought into contact with a sample tube 201 or can be separated from the sample tube 201.

With such a configuration, the heater block 321 can heat the sample tube 201 in a state where the heater block 321 is in contact with the sample tube 201, and the heater block 321 can be separated from the sample tube 201 after desorbed sample components are collected from the sample tube 201 into a trap column (not illustrated). Therefore, if the sample tube 201 is cooled in a state where the heater block 321 is separated from the sample tube 201, cooling time can be shortened.

PRIOR ART DOCUMENT

Patent Document

Patent Document 1: JP 5648608 B1

SUMMARY OF THE INVENTION

Problems to be Solved by the Invention

However, in the configuration illustrated in FIG. 7, it is necessary to provide a mechanism for moving the tube heating unit 320 separately from the movement mechanism 230 for moving the tube holding unit 210. Therefore, there is a problem that the structure becomes complicated and the manufacturing cost increases.

The present invention has been made in view of the above circumstances. An object of the present invention is to provide a sample introduction device capable of separately moving a tube holding unit and a tube heating unit with a simple configuration.

Means for Solving the Problems (1) A sample introduction device according to the present invention is a sample introduction device for heating a sample tube containing a sample to desorb a sample component and to introduce the sample component to an analyzing unit. The sample introduction device includes a tube holding unit, a tube heating unit, and a movement mechanism. The tube holding units holds the sample tube. The tube heating unit comes into contact with the sample tube held in the tube holding unit and heats the sample tube to desorb sample component in the sample tube. The tube holding unit and the tube heating unit are attached to the movement mechanism such that the tube holding unit and the tube heating unit can move separately. The movement mechanism includes a connecting member which can be attached to and detached from the tube holding unit and the tube heating unit, and a support portion which supports the connecting member such that the connecting member can move.

According to such a configuration, by moving the connecting member which can be attached to and detached from the tube holding unit and the tube heating unit, the tube holding unit and the tube heating unit can be separately moved. That is, it is not necessary to provide a mechanism for moving the tube heating unit separately from the mechanism for moving the tube holding unit. It is possible to separately move the tube holding unit and the tube heating unit with a simple configuration including the common connecting member.

(2) The support portion may include a support shaft extending in a straight line. In this case, the connecting member may be supported by the support shaft such that the connecting member can move on a straight line along the support shaft.

According to such a configuration, it is possible to separately move the tube holding unit and the tube heating unit on a straight line, by using the common connecting member supported by the support shaft extending in the straight line. Therefore, it is possible to separately move the tube holding unit and the tube heating unit with a simple configuration in which the connecting member is supported by the support shaft.

(3) The connecting member may include a magnet which can be attached to and detached from the tube holding unit and the tube heating unit due to magnetic force.

According to such a configuration, the connecting member including the magnet can be individually coupled to the tube holding unit and the tube heating unit by magnetic force. Therefore, it is possible to separately move the tube holding unit and the tube heating unit with a simple configuration using the magnet.

(4) The movement mechanism may include a first stopper. The first stopper separates the connecting member from the tube holding unit by restricting movement of the tube holding unit at a position where the sample tube comes into contact with the tube heating unit when the connecting member moves from a tube holding-unit side to a tube heating-unit side in a state where the connecting member is coupled to the tube holding unit.

According to such a configuration, since the first stopper restricts movement of the tube holding unit, it is possible to reliably stop the tube holding unit at a position where the sample tube comes into contact with the tube heating unit. Then, by moving the connecting member in a state where the first stopper stops movement of the tube holding unit, the connecting member can be separated from the tube holding unit. Therefore, the connecting member can be easily and reliably attached to and detached from the tube holding unit.

(5) When the first stopper causes the connecting member to be separated from the tube holding unit, the connecting member may separate the tube heating unit from the tube holding unit in association with movement of the connecting member to the tube heating-unit side.

According to such a configuration, the tube heating unit can be separated from the tube holding unit by using the connecting member which separates from the tube holding unit. Therefore, with a simple configuration of only moving the connecting member, the tube holding unit which moves to the tube heating-unit side can be reliably stopped at the position where the sample tube comes into contact with the tube heating unit, and then the tube heating unit can be separated from the tube holding unit. Therefore, since the sample tube can be cooled in a state where the tube heating unit is separated from the sample tube, cooling time of the sample tube can be shortened.

(6) The movement mechanism may include a second stopper. The second stopper separates the connecting member from the tube heating unit by restricting movement of the tube heating unit at a position where the sample tube comes into contact with the tube heating unit when the connecting member moves from a tube heating-unit side to a tube holding-unit side in a state where the connecting member is coupled to the tube heating unit.

According to such a configuration, since the second stopper restricts movement of the tube holding unit, it is possible to reliably stop the tube heating unit at the position where the sample tube comes into contact with the tube heating unit. Then, by moving the connecting member in a state where the second stopper stops movement of the tube heating unit, the connecting member can be separated from the tube heating unit. Therefore, the connecting member can be easily and reliably attached to and detached from the tube heating unit.

(7) When the second stopper causes the connecting member to be separated from the tube heating unit, the connecting member may separate the tube holding unit from the tube heating unit in association with movement of the connecting member to the tube holding-unit side.

According to such a configuration, the tube holding unit can be separated from the tube heating unit by using the connecting member which separates from the tube heating unit. Therefore, with a simple configuration of only moving the connecting member, the tube heating unit which moves to the tube holding-unit side can be reliably stopped at the position where the sample tube comes into contact with the tube heating unit, and then the tube holding unit can be separated from the tube heating unit.

Effects of the Invention

According to the present invention, it is not necessary to provide a mechanism for moving the tube heating unit separately from the mechanism for moving the tube holding unit. It is possible to separately move the tube holding unit and the tube heating unit with a simple configuration including the common connecting member.

MODE FOR CARRYING OUT THE INVENTION

1. Configuration of Heating Mechanism

FIGS. 1A to 1G are plan views illustrating an exemplary configuration of a heating mechanism 100 of a sample tube 1 in a sample introduction device according to an embodiment of the present invention. FIGS. 2A to 2G are side views of the heating mechanism 100 corresponding to FIGS. 1A to 1G, respectively.

Figure 1A:
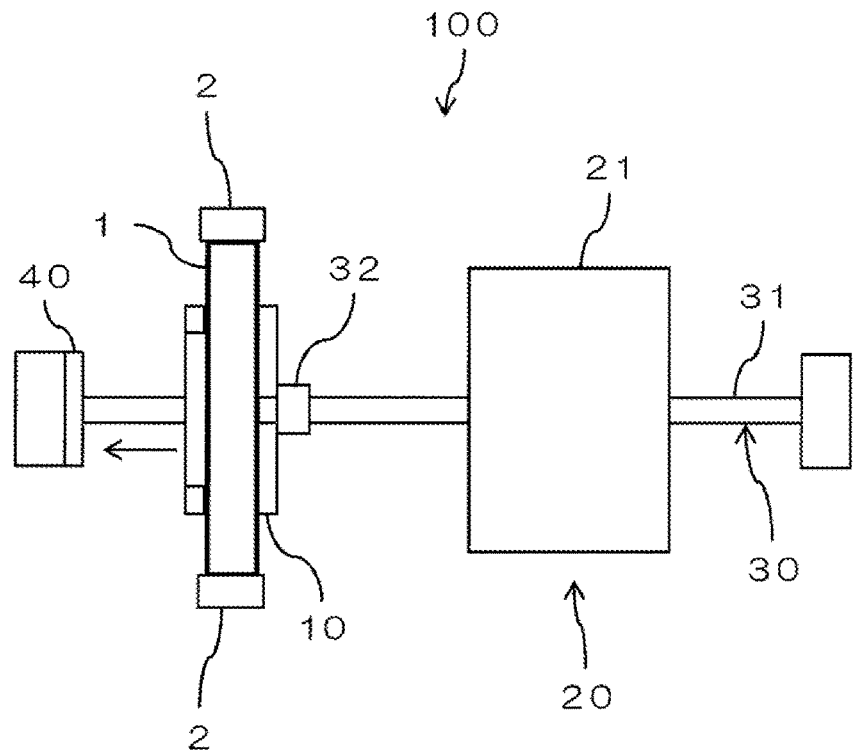
FIG. 1A is a plan view illustrating an exemplary configuration of a heating mechanism of a sample tube in a sample introduction device according to an embodiment of the present invention.

The sample tube 1 is formed, for example, in a cylindrical shape. Before an analysis, as illustrated in FIG. 1A, both ends of the sample tube 1 are closed by caps 2 in a state where a sample is contained therein. The sample is contained in a state of being adsorbed on an adsorbent (not illustrated) provided in the sample tube 1. The heating mechanism 100 includes a tube holding unit 10 which holds the sample tube 1, a tube heating unit 20 which heats the sample tube 1, and a movement mechanism 30 to which the tube holding unit 10 and the tube heating unit 20 are movably attached.

The movement mechanism 30 includes a support shaft 31 extending in a straight line in a horizontal direction, and a nut 32 attached to the support shaft 31. The nut 32 is provided as a separate member separated from the tube holding unit 10 and the tube heating unit 20. A screw thread is formed on the outer peripheral surface of the support shaft 31. The nut 32 is screwed onto the thread to be attached to the support shaft 31. The nut 32 includes a permanent magnet and constitutes a connecting member that can be coupled to a magnetic material due to magnetic force.

The support shaft 31 is rotatably provided. Therefore, if the support shaft 31 is rotated in a state where the nut 32 does not rotate, the nut 32 can be moved along the support shaft 31 in a straight line. That is, the support shaft 31 constitutes a support portion that supports the nut 32 such that the nut 32 can move. The moving direction of the nut 32 along the support shaft 31 is reversed according to the rotating direction of the support shaft 31.

The tube holding unit 10 holds the sample tube 1 such that the sample tube 1 extends perpendicularly to the support shaft 31 and in a horizontal direction. At least part of the tube holding unit 10 is formed of a magnetic material. Thus, the nut 32 can be attached to and detached from the tube holding unit 10 due to magnetic force. Examples of the magnetic material may include iron; however, the magnetic material is not limited to iron. The tube holding unit 10 is disposed in a state where the support shaft 31 penetrates the tube holding unit 10. Note that the support shaft 31 is not screwed into the tube holding unit 10. The support shaft 31 only penetrates the tube holding unit 10. Unlike the nut 32, the tube holding unit 10 does not move when the support shaft 31 rotates.

The tube heating unit 20 has a configuration in which a heater block 21 and a support base 22 which supports the heater block 21 are integrally formed. The tube heating unit 20 is disposed in a state where the support shaft 31 penetrates the support base 22. Note that the support shaft 31 is not screwed into the support base 22. The support shaft 31 only penetrates the support base 22. Unlike the nut 32, the tube heating unit 20 does not move when the support shaft 31 rotates.

The tube holding unit 10 and the tube heating unit 20 are attached to the support shaft 31 such that the tube holding unit 10 and the tube heating unit 20 can move separately. The movement mechanism 30 includes a stopper 33 for restricting movement of the tube holding unit 10 and the tube heating unit 20. The stopper 33 is located on the movement locus of the tube holding unit 10 and the tube heating unit 20 along the support shaft 31. The stopper 33 comes into contact with the tube holding unit 10 and the tube heating unit 20 to restrict movement of the tube holding unit 10 and the tube heating unit 20. The stopper 33 prevents the movable range of the tube holding unit 10 and the movable range of the tube heating unit 20 from overlapping with each other. The tube holding unit 10 moves only on one side (the left side in FIGS. 2A to 2G) with respect to the stopper 33. The tube heating unit 20 moves only on the other side (the right side in FIGS. 2A to 2G) with respect to the stopper 33.

The heater block 21 is made of a material having high thermal conductivity such as aluminum. The support base 22 is formed of a magnetic material made of a material different from that of the heater block 21. Thus, the nut 32 can be attached to and detached from the support base 22 of the tube heating unit 20 due to magnetic force. Examples of the magnetic material may include iron; however, the magnetic material is not limited to iron.

Figure 2A:
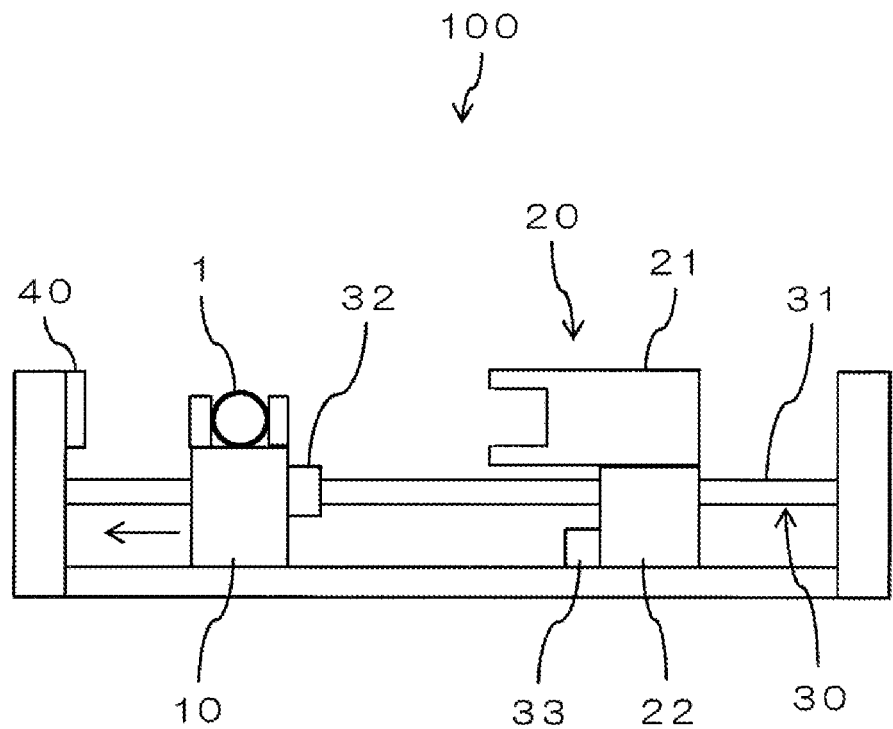
FIG. 2A is a side view of the heating mechanism corresponding to FIG. 1A.

On the side opposite to a tube heating unit 20 side with respect to the tube holding unit 10, a pressing unit 40 is provided for pressing and sandwiching the sample tube 1 held by the tube holding unit 10. In a state in which the tube holding unit 10 is positioned at an initial position (attaching and detaching position of the sample tube 1) as illustrated in FIG. 1A and FIG. 2A, the nut 32 is coupled to the tube holding unit 10 due to magnetic force and is not coupled to the tube heating unit 20.

2. Electrical Configuration of Sample Introduction Device

Figure 3:
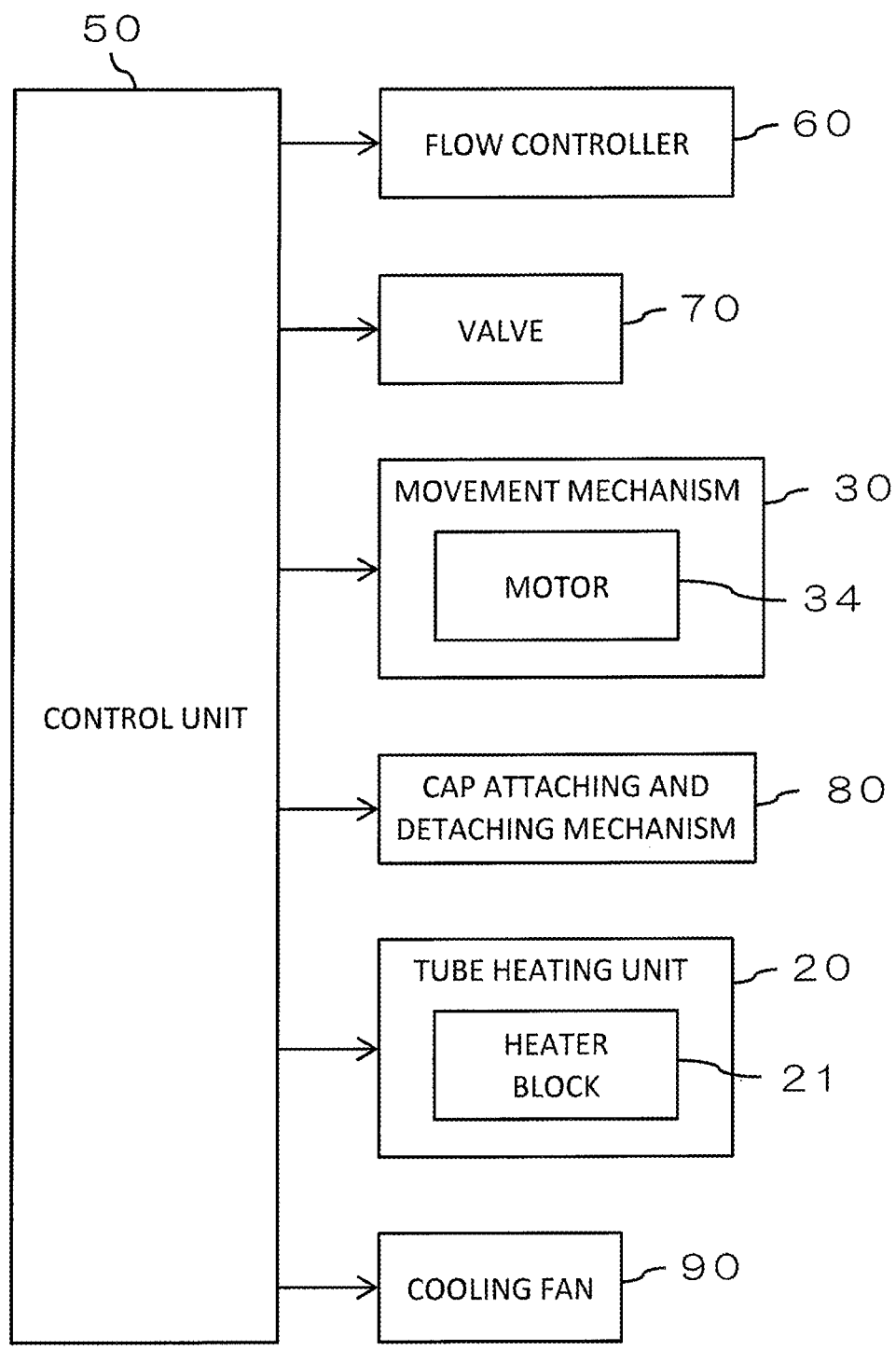
FIG. 3 is a block diagram illustrating an example of an electrical configuration of the sample introduction device.

FIG. 3 is a block diagram illustrating an example of the electrical configuration of the sample introduction device. Operation of the sample introduction device is controlled by a control unit 50 including a CPU (Central Processing Unit), for example. In addition to the tube heating unit 20 and the movement mechanism 30 described above, a flow controller 60, a valve 70, a cap attaching and detaching mechanism 80, a cooling fan 90, and the like are electrically connected to the control unit 50.

The flow controller 60 controls the flow rate of a carrier gas used for introducing a sample into the analyzing unit. The valve 70 is configured of, for example, a six-way valve, and switches the flow path of the carrier gas in the sample introduction device. The cap attaching and detaching mechanism 80 is a mechanism for attaching and detaching the caps 2 attached to the both ends of the sample tube 1. The cooling fan 90 is an example of a cooling mechanism for cooling the sample tube 1.

The movement mechanism 30 includes a motor 34. The movement mechanism 30 rotates the motor 34 to rotate the support shaft 31 and to move the nut 32 along the support shaft 31. The motor 34 can rotate forward and backward. If the motor 34 is configured of a stepping motor, for example, accurate positioning control can be performed.

3. Operation of Sample Introduction Device

Figure 4A:
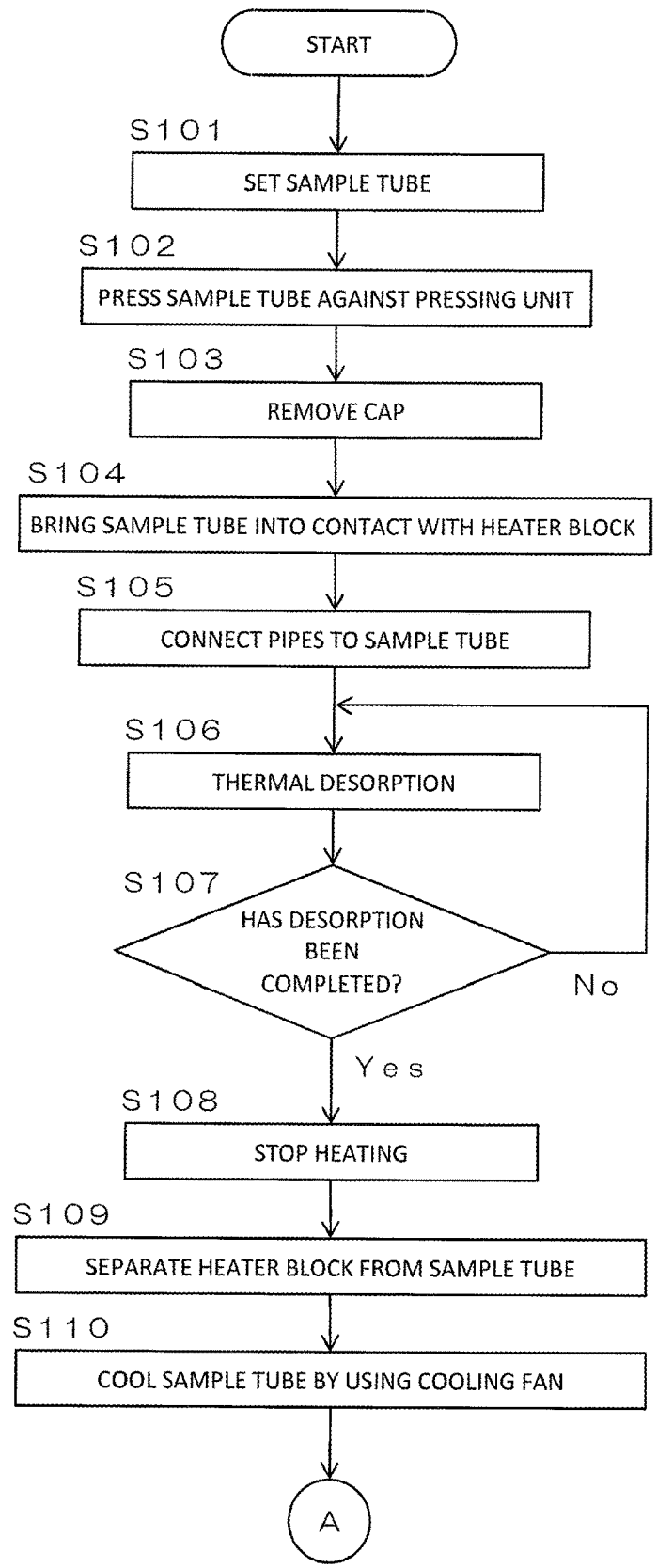
FIG. 4A is a flowchart illustrating one example of processing performed by a control unit when a sample is introduced from the sample introduction device to an analyzing unit.
Figure 4B:
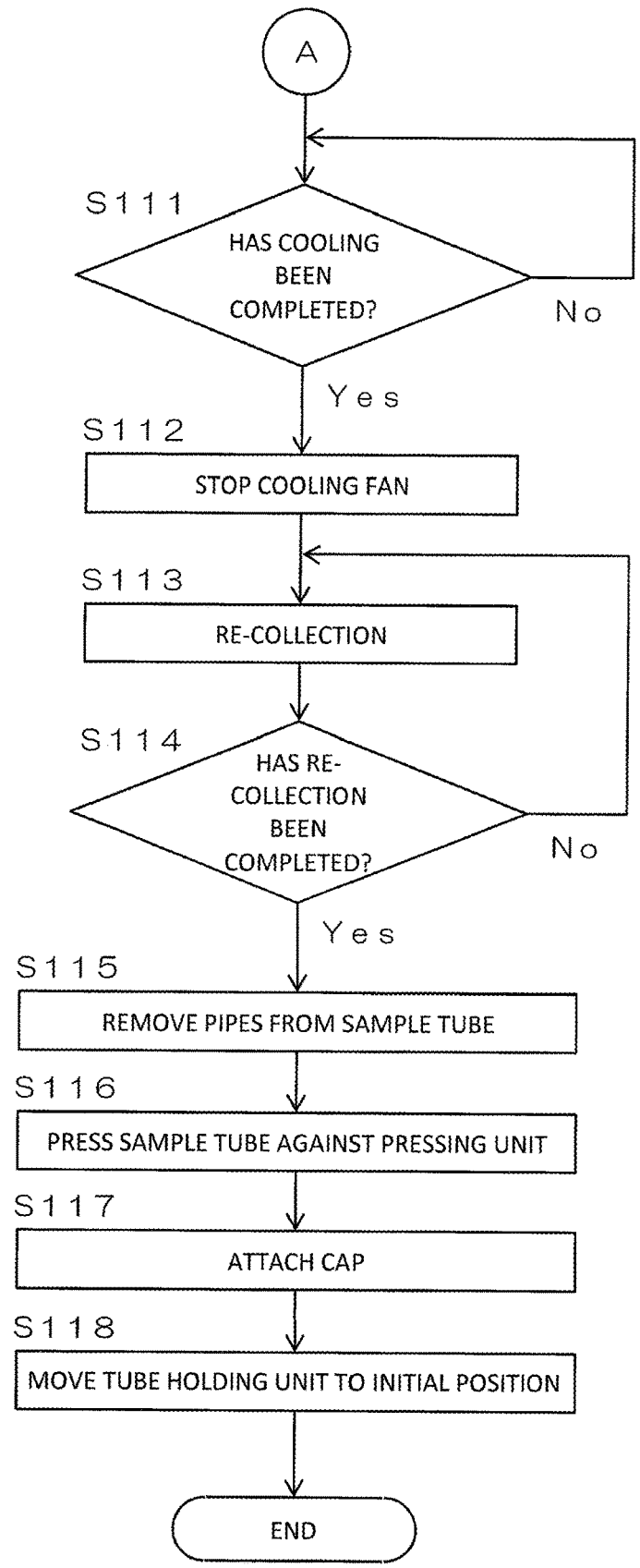
FIG. 4B is a flowchart illustrating the one example of processing performed by the control unit when the sample is introduced from the sample introduction device to the analyzing unit.
Figure 5A:
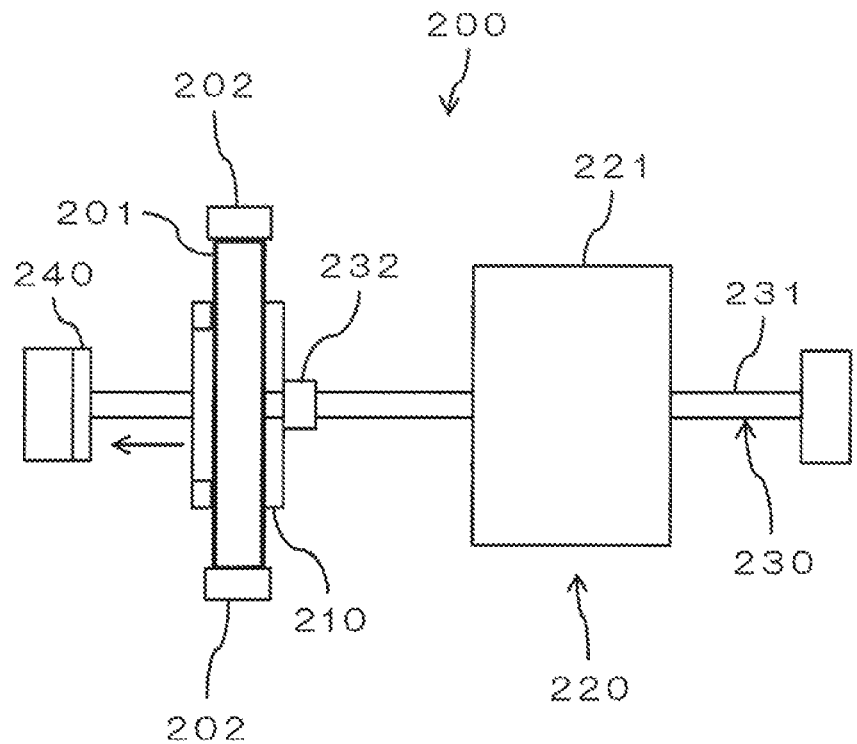
FIG. 5A is a plan view illustrating an exemplary configuration of a heating mechanism of a sample tube in a conventional sample introduction device.
Figure 5B:
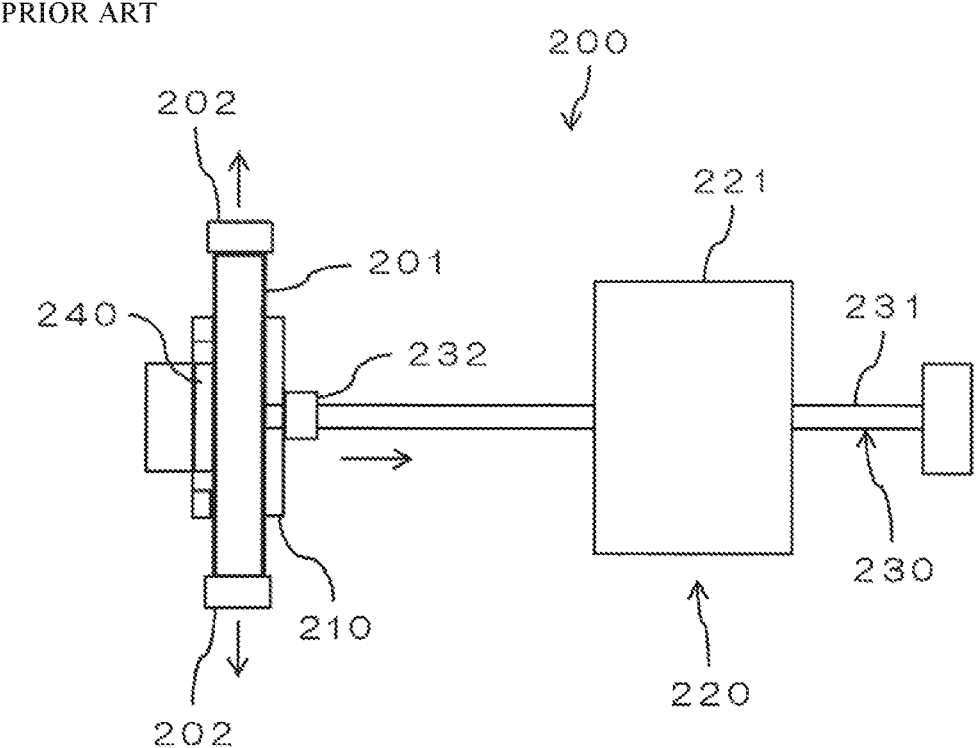
FIG. 5B is a plan view illustrating the exemplary configuration of the heating mechanism of the sample tube in the conventional sample introduction device.
Figure 5C:
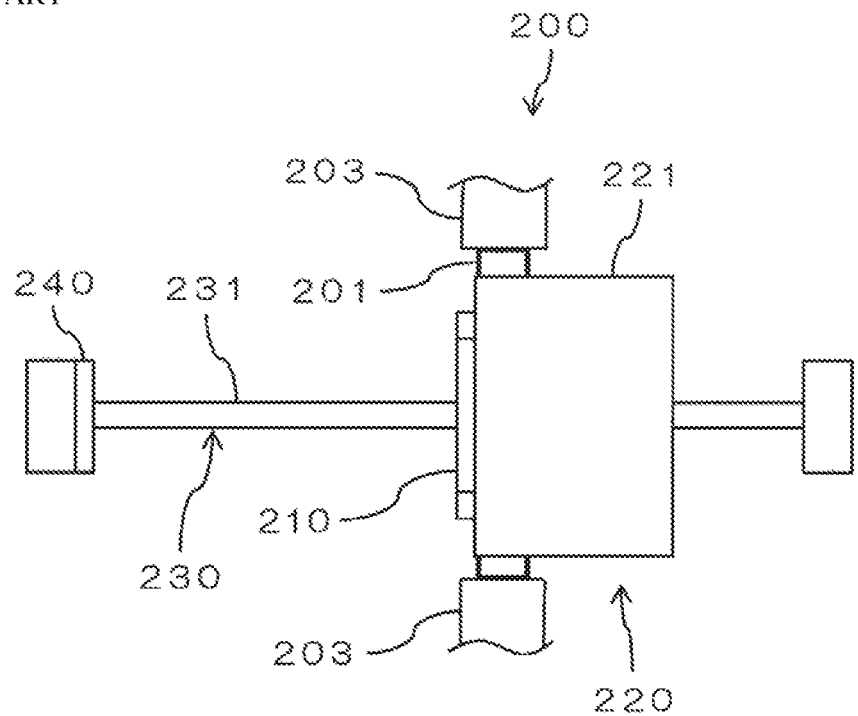
FIG. 5C is a plan view illustrating the exemplary configuration of the heating mechanism of the sample tube in the conventional sample introduction device.
Figure 6A:
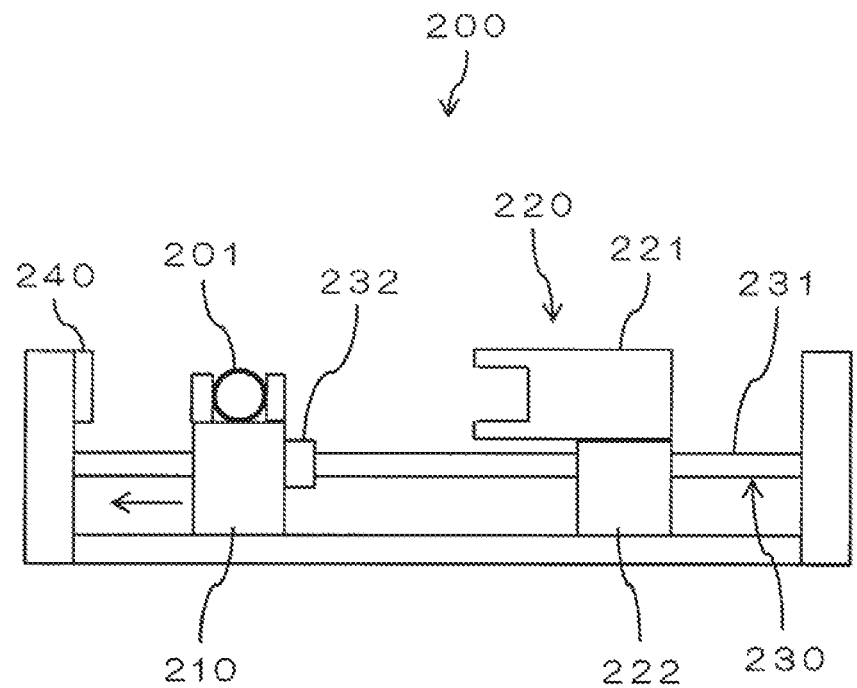
FIG. 6A is a side view of the heating mechanism 200 corresponding to FIG. 5A.
Figure 6B:
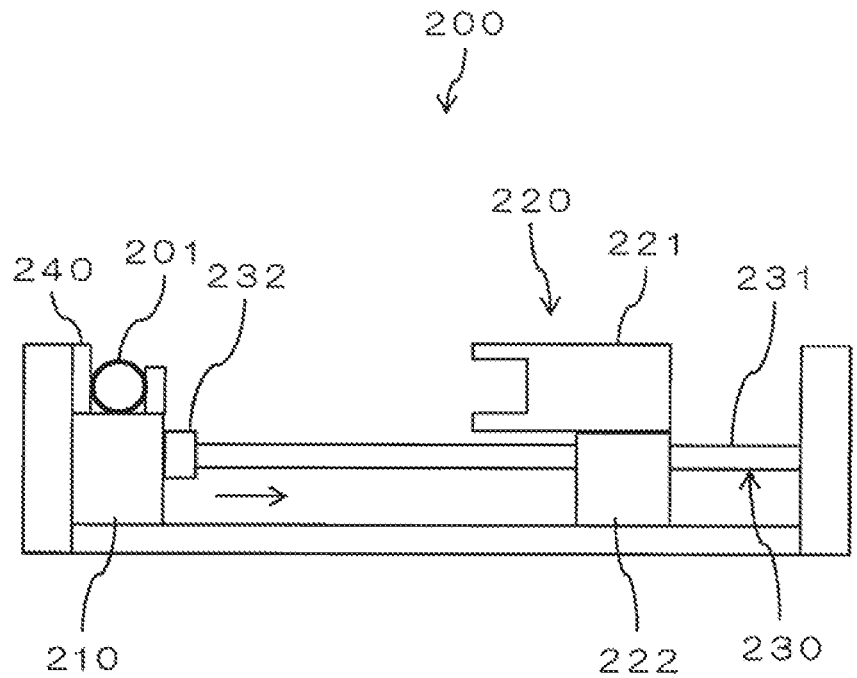
FIG. 6B is a side view of the heating mechanism 200 corresponding to FIG. 5B.
Figure 6C:
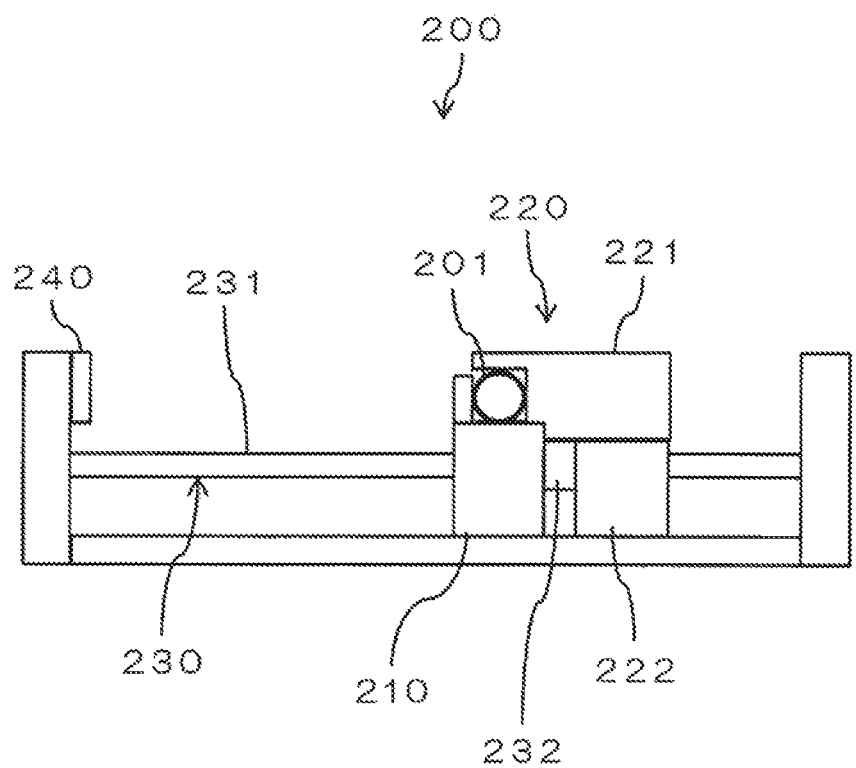
FIG. 6C is a side view of the heating mechanism 200 corresponding to FIG. 5C.
Figure 7:
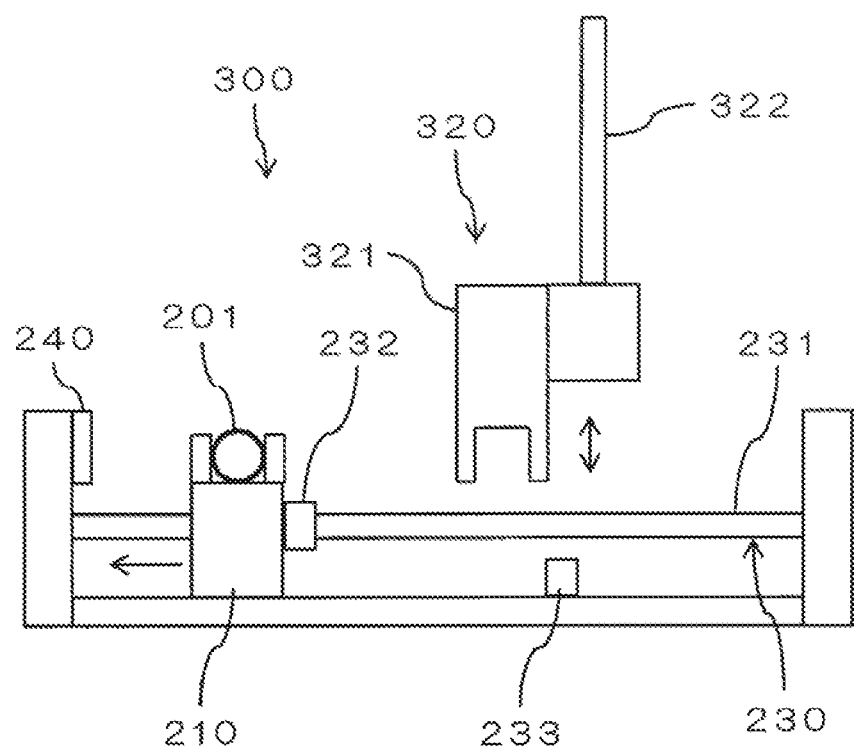
FIG. 7 is a side view illustrating an exemplary configuration of a heating mechanism of a sample tube in another conventional sample introduction device.

FIGS. 4A and 4B illustrate a flowchart depicting one example of processing performed by the control unit 50 when a sample is introduced from the sample introduction device to the analyzing unit. Hereinafter, with reference to FIGS. 1A to 1G, 2A to 2G, 3, 4A, and 4B, operation of the heating mechanism 100 in the sample introduction device will be described in detail.

Figure 1B:
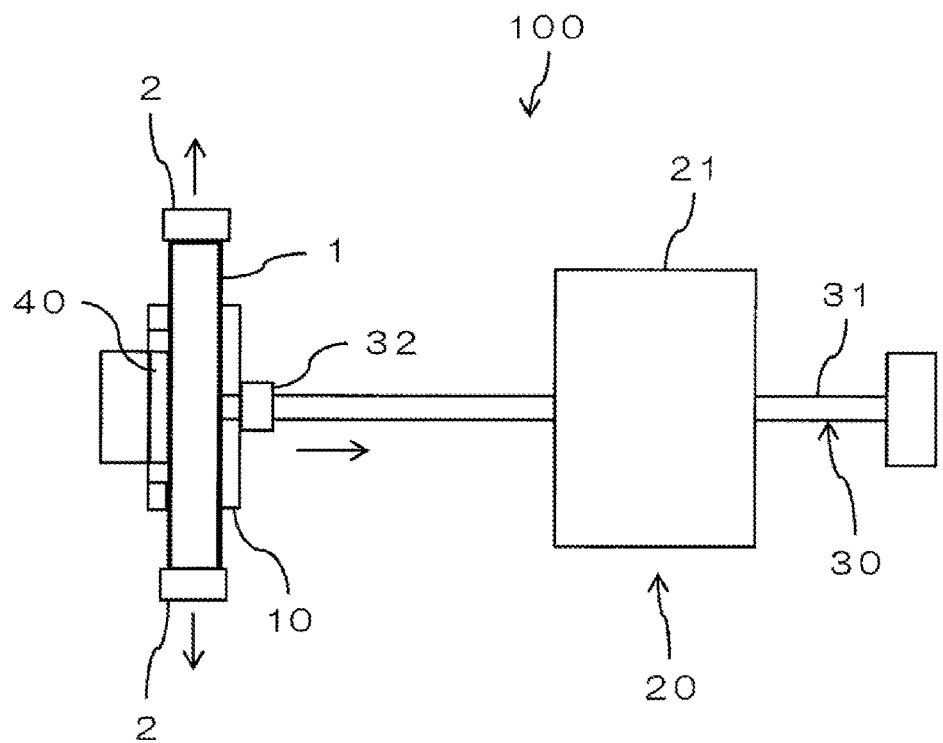
FIG. 1B is a plan view illustrating the exemplary configuration of the heating mechanism of the sample tube in the sample introduction device according to the embodiment of the present invention.
Figure 2B:
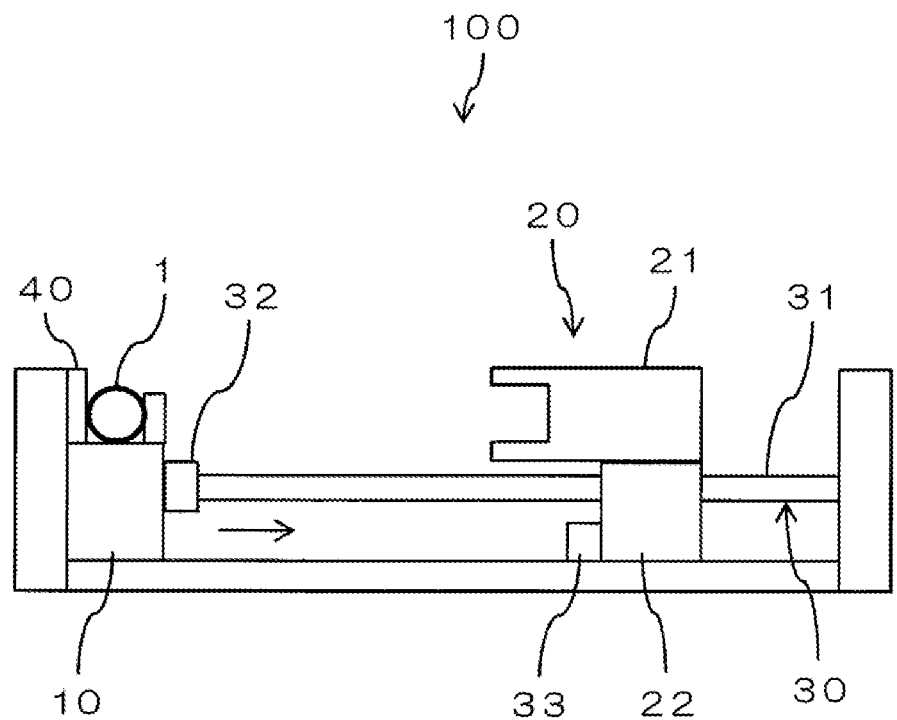
FIG. 2B is a side view of the heating mechanism corresponding to FIG. 1B.

When the sample tube 1 is set in the tube holding unit 10 in a state as illustrated in FIGS. 1A and 2A (step S101), first, the support shaft 31 is rotated to move the nut 32 together with the tube holding unit 10 to the pressing unit 40 side. Thus, as illustrated in FIGS. 1B and 2B, the pressing unit 40 abuts against the outer peripheral surface of the sample tube 1, and the sample tube 1 is sandwiched between the pressing unit 40 and the tube holding unit 10 (step S102). Then, the caps 2 are removed from the both ends of the sample tube 1 by operation of the cap attaching and detaching mechanism 80 (step S103). At that time, it is possible to prevent the sample tube 1 from moving in the longitudinal direction due to pressing force of the pressing unit 40.

Figure 1C:
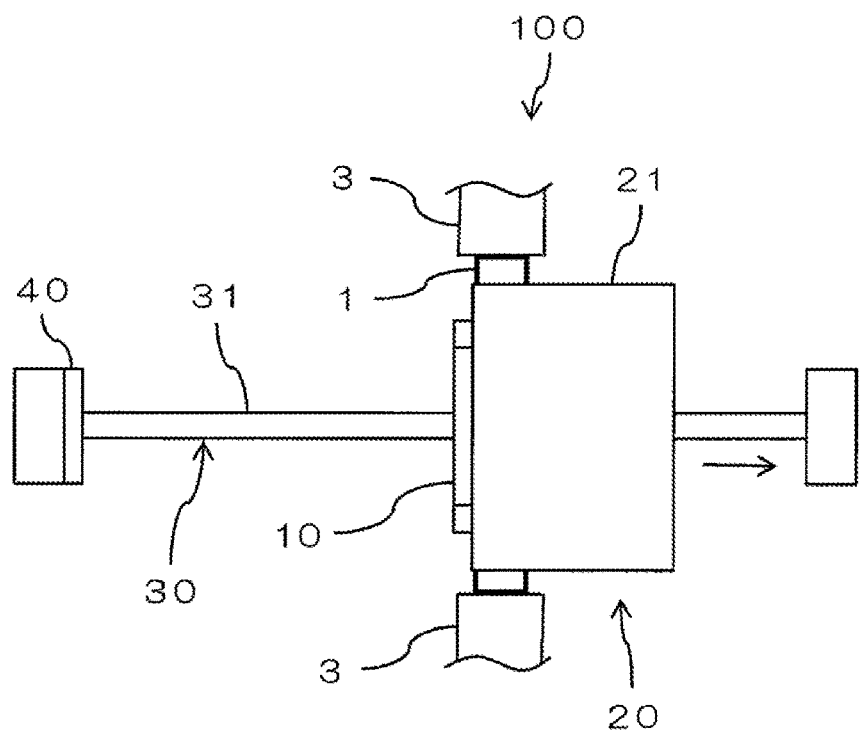
FIG. 1C is a plan view illustrating the exemplary configuration of the heating mechanism of the sample tube in the sample introduction device according to the embodiment of the present invention.
Figure 2C:
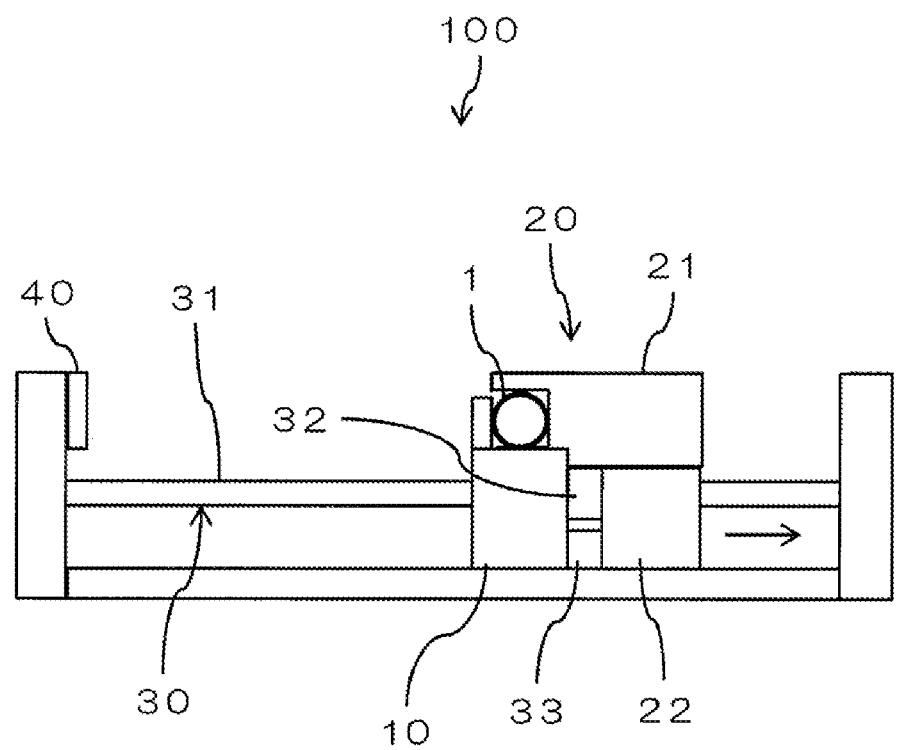
FIG. 2C is a side view of the heating mechanism corresponding to FIG. 1C.

Then, the support shaft 31 is rotated, and thus the nut 32 moves to the tube heating unit 20 side in a state where the nut 32 is coupled to the tube holding unit 10. Accordingly, the tube holding unit 10 gradually approaches the tube heating unit 20 along the support shaft 31. As illustrated in FIGS. 1C and 2C, when the tube holding unit 10 comes into contact with the stopper 33, the nut 32 abuts against the support base 22 of the tube heating unit 20 that is in contact with the stopper 33 from the opposite side. As a result, the nut 32 is coupled to both the tube holding unit 10 and the tube heating unit 20 due to magnetic force.

In this state, the sample tube 1 is in contact with the heater block 21 (step S104). At this position, pipes 3 for circulating the carrier gas into the sample tube 1 are connected to the both ends of the sample tube 1 (step S105). Then, the heater block 21 is heated, and the flow controller 60 and the valve 70 are controlled so that the carrier gas circulates in the sample tube 1 via the pipes 3. As a result, sample components in the sample tube 1 are volatilized and desorbed, and the sample components delivered by the carrier gas from the sample tube 1 via the pipes 3 are collected in a trap column (not illustrated) (step S106).

If thermal desorption of the sample components from the sample tube 1 has been completed (Yes in step S107) after the sample tube 1 has been heated for a predetermined time, the heater block 21 stops heating (step S108). Then, the support shaft 31 is rotated, and thus the nut 32 moves further to the tube heating unit 20 side as illustrated in FIGS. 1D and 2D.

At that time, since movement of the tube holding unit 10 is restricted by the stopper 33, the tube holding unit 10 cannot move further to the tube heating unit 20 side. Therefore, the nut 32 is separated from the tube holding unit 10 against the magnetic force of the nut 32. That is, since the stopper 33 restricts movement of the tube holding unit 10 at a position where the sample tube 1 comes into contact with the tube heating unit 20, the nut 32 is separated from the tube holding unit 10.

In addition, when the nut 32 separates from the tube holding unit 10, the tube heating unit 20 is pressed by the nut 32 in association with movement of the nut 32 to the tube heating unit 20 side. As a result, the tube heating unit 20 separates from the tube holding unit 10, and the heater block 21 and the sample tube 1 are not in contact with each other (step S109).

Figure 1D:
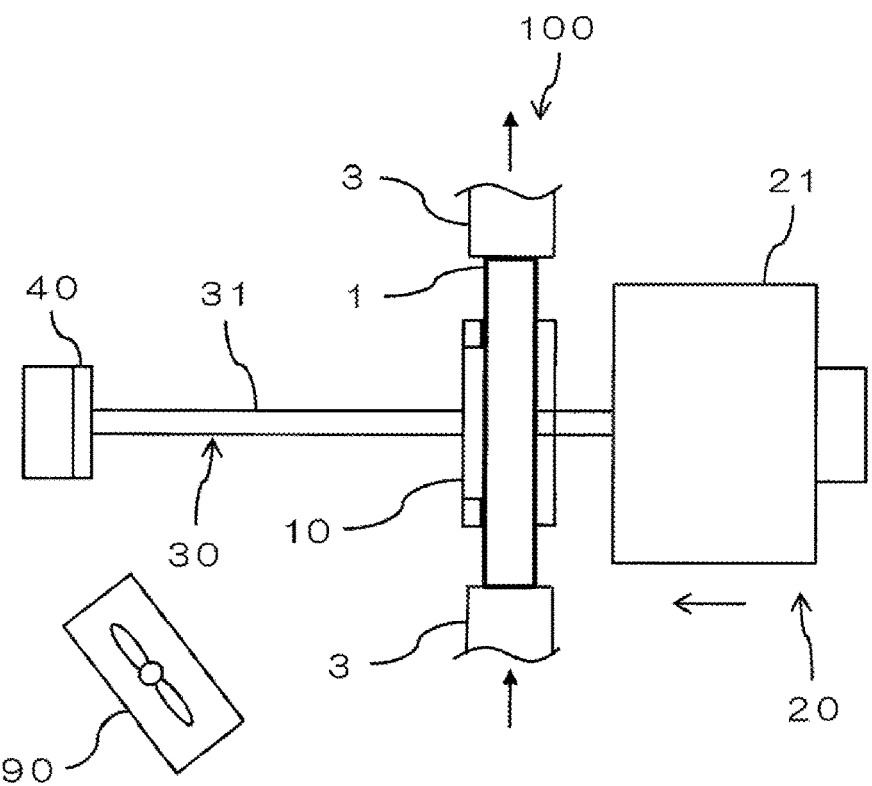
FIG. 1D is a plan view illustrating the exemplary configuration of the heating mechanism of the sample tube in the sample introduction device according to the embodiment of the present invention.
Figure 2D:
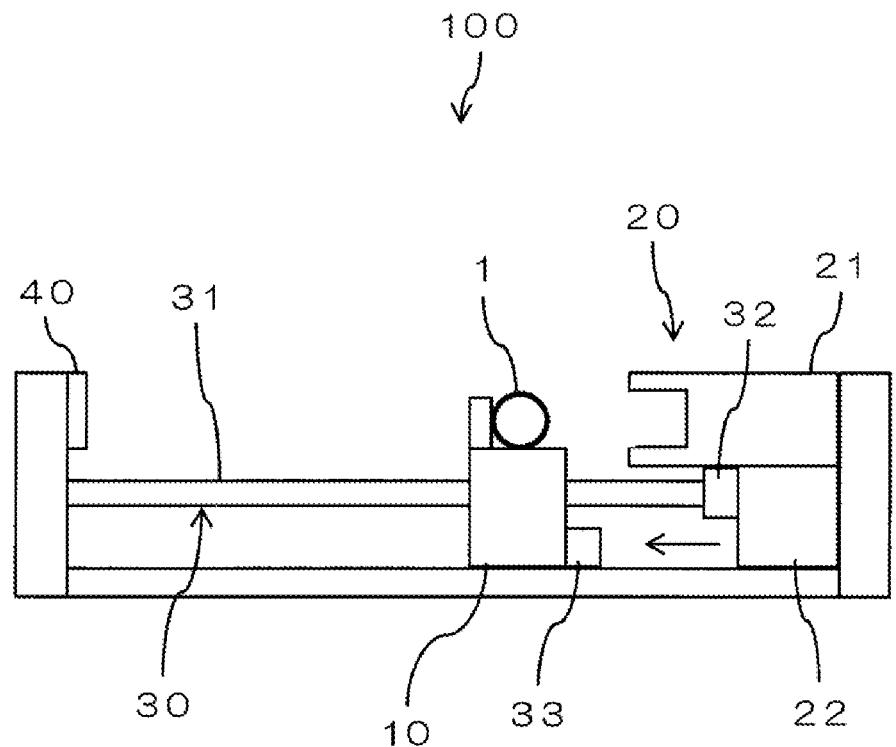
FIG. 2D is a side view of the heating mechanism corresponding to FIG. 1D.

In this state, as illustrated in FIG. 1D, the sample tube 201 is cooled by the cooling fan 90 (step S110). It is preferable that the cooling fan 90 is provided near the sample tube 201. It is more preferable that the cooling fan 90 cools the sample tube 201 from the side opposite to the tube heating unit 20 side with respect to the tube holding unit 10.

If the sample tube 1 is sufficiently cooled (Yes in step S111) after the cooling fan 90 is driven for a predetermined time, operation of the cooling fan 90 is stopped (step S112). Then, the trap column is heated, and the flow controller 60 and the valve 70 are controlled so that the carrier gas is supplied into the trap column. As a result, the sample components in the trap column are volatilized and desorbed. The carrier gas introduces the sample components into the analyzing unit.

At that time, part of the carrier gas containing the sample components is introduced into the sample tube 1 via the pipes 3. Since the sample tube 1 is sufficiently cooled, the sample components are recollected in the sample tube 1 (step S113). As described above, by introducing only part of the sample components contained in the sample tube 1 into the analyzing unit and re-collecting the remaining sample components in the sample tube 1, the bandwidth of a detection peak can be narrowed.

If re-collection of the sample components in the sample tube 1 is completed (Yes in step S114), the pipes 3 are removed from the both ends of the sample tube 1 (step S115). Then, the support shaft 31 is rotated, and thus the nut 32 moves to the tube holding unit 10 side in a state where the nut 32 is coupled to the tube heating unit 20.

Figure 1E:
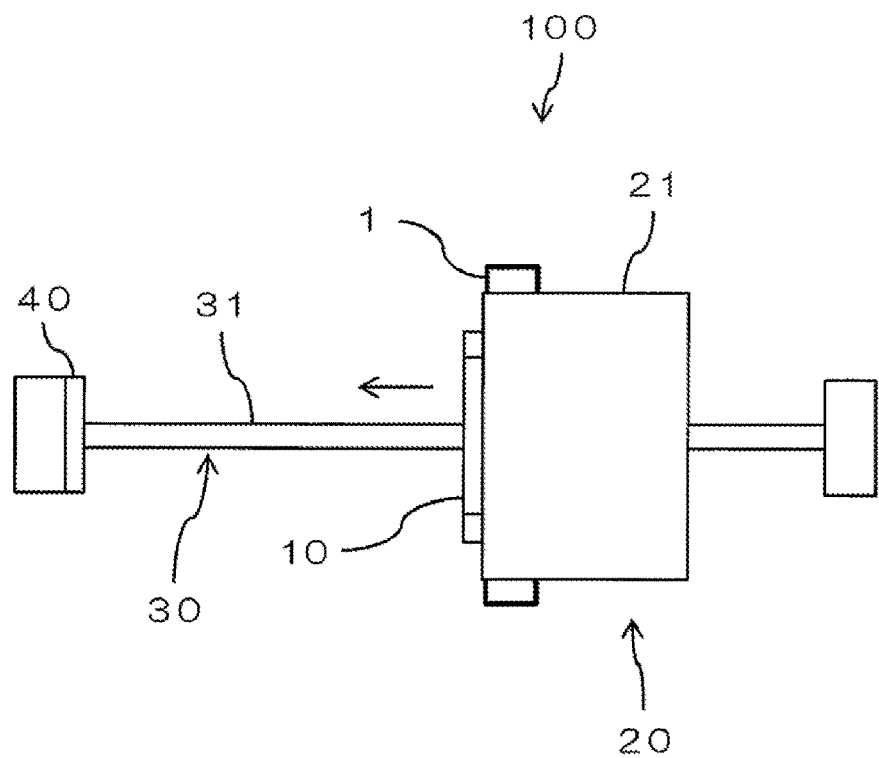
FIG. 1E is a plan view illustrating the exemplary configuration of the heating mechanism of the sample tube in the sample introduction device according to the embodiment of the present invention.
Figure 2E:
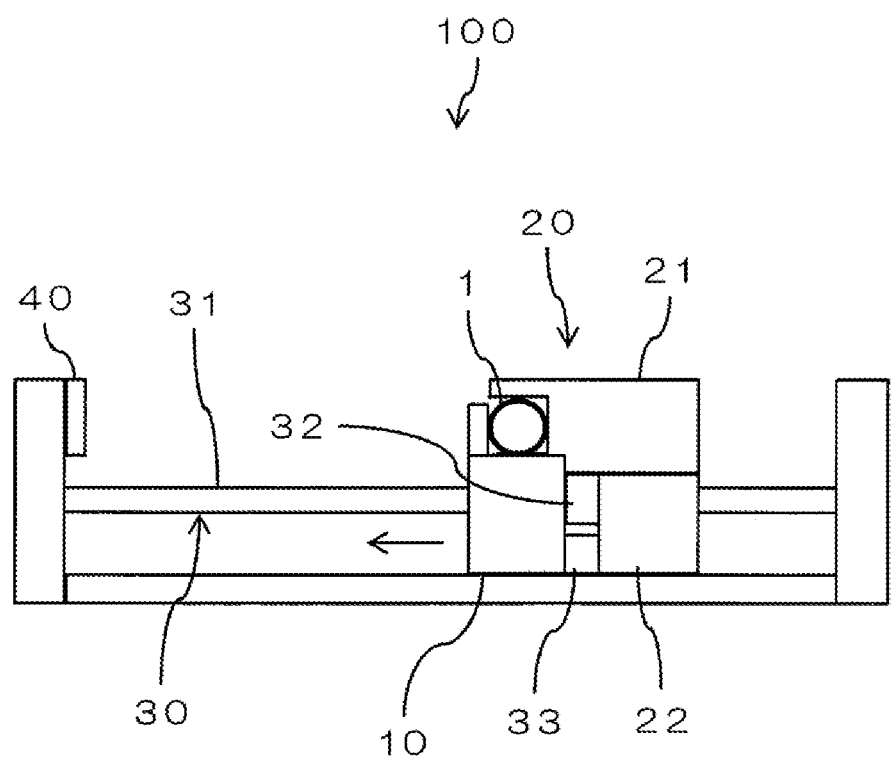
FIG. 2E is a side view of the heating mechanism corresponding to FIG. 1E.

Accordingly, the tube heating unit 20 gradually approaches the tube holding unit 10 along the support shaft 31. As illustrated in FIGS. 1E and 2E, when the tube heating unit 20 comes into contact with the stopper 33, the nut 32 abuts against the tube holding unit 10 that is in contact with the stopper 33 from the opposite side. As a result, the nut 32 is coupled to both the tube holding unit 10 and the tube heating unit 20 due to magnetic force.

Then, the support shaft 31 is further rotated, and thus the nut 32 moves to the tube holding unit 10 side. At that time, since the movement of the tube heating unit 20 is restricted by the stopper 33, the tube heating unit 20 cannot move further to the tube holding unit 10 side. Therefore, the nut 32 is separated from the tube heating unit 20 against the magnetic force of the nut 32. That is, since the stopper 33 restricts movement of the tube heating unit 20 at the position where the sample tube 1 comes into contact with the tube heating unit 20, the nut 32 is separated from the tube heating unit 20.

In addition, when the nut 32 separates from the tube heating unit 20, the tube holding unit 10 is pressed by the nut 32 in association with movement of the nut 32 to the tube holding unit 10 side. As a result, the tube holding unit 10 separates from the tube heating unit 20, and the heater block 21 and the sample tube 1 are not in contact with each other.

Figure 1F:
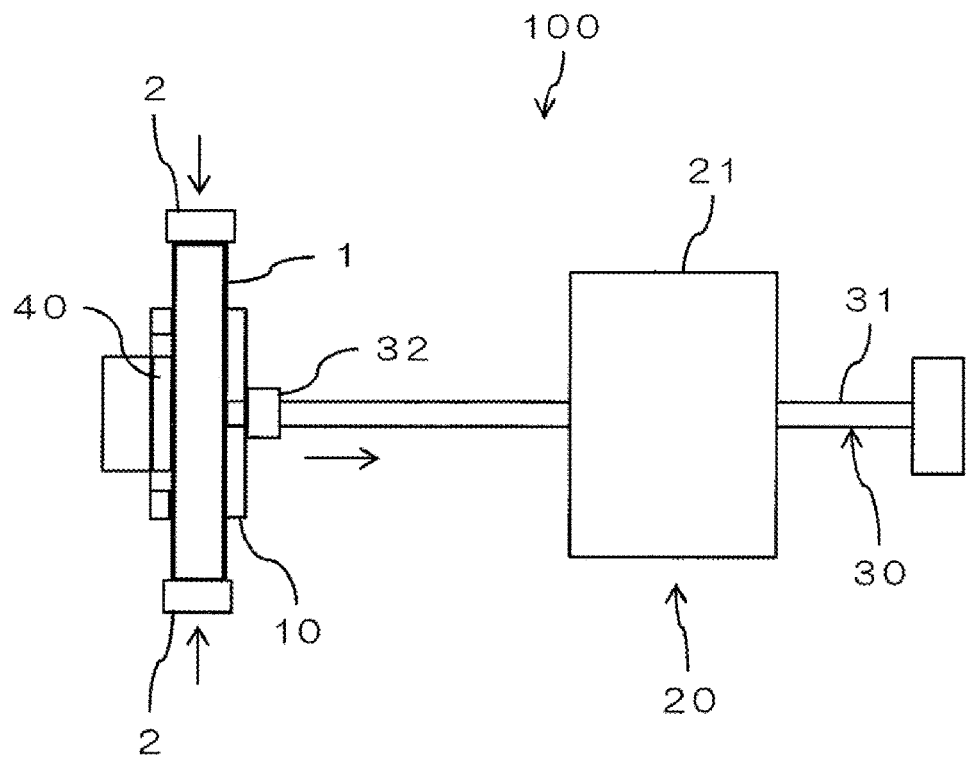
FIG. 1F is a plan view illustrating the exemplary configuration of the heating mechanism of the sample tube in the sample introduction device according to the embodiment of the present invention.
Figure 2F:
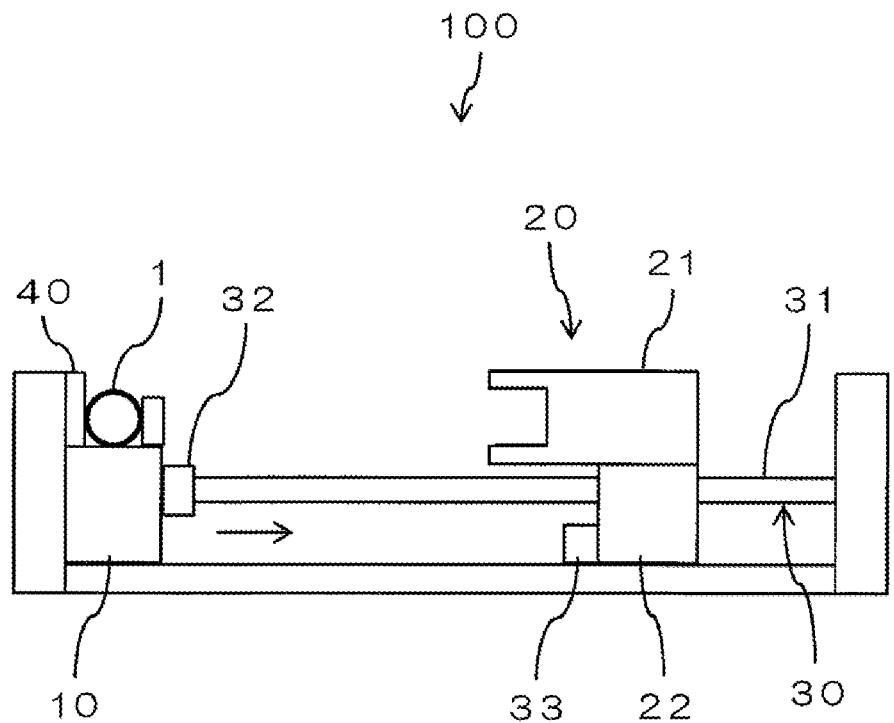
FIG. 2F is a side view of the heating mechanism corresponding to FIG. 1F.

If the support shaft 31 is further rotated in this manner, the nut 32 moves to the pressing unit 40 side together with the tube holding unit 10. Thus, as illustrated in FIGS. 1F and 2F, the pressing unit 40 abuts against the outer peripheral surface of the sample tube 1, and the sample tube 1 is sandwiched between the pressing unit 40 and the tube holding unit 10 (step S116). Then, the caps 2 are attached to the both ends of the sample tube 1 by operating the cap attaching and detaching mechanism 80 (step S117). At that time, it is possible to prevent the sample tube 1 from moving in the longitudinal direction due to pressing force of the pressing unit 40.

Figure 1G:
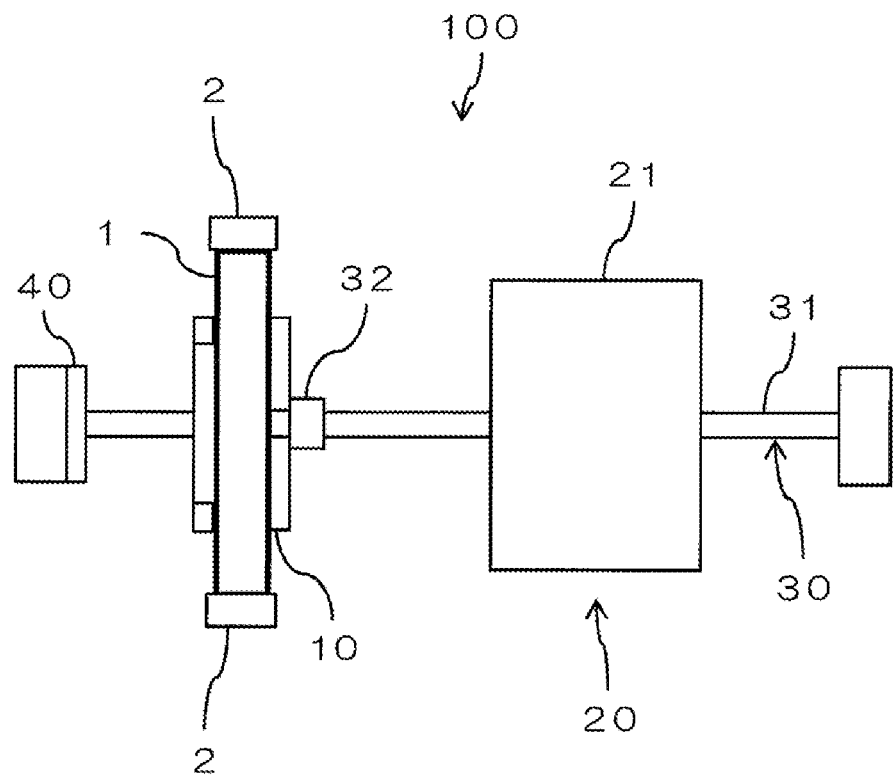
FIG. 1G is a plan view illustrating the exemplary configuration of the heating mechanism of the sample tube in the sample introduction device according to the embodiment of the present invention.
Figure 2G:
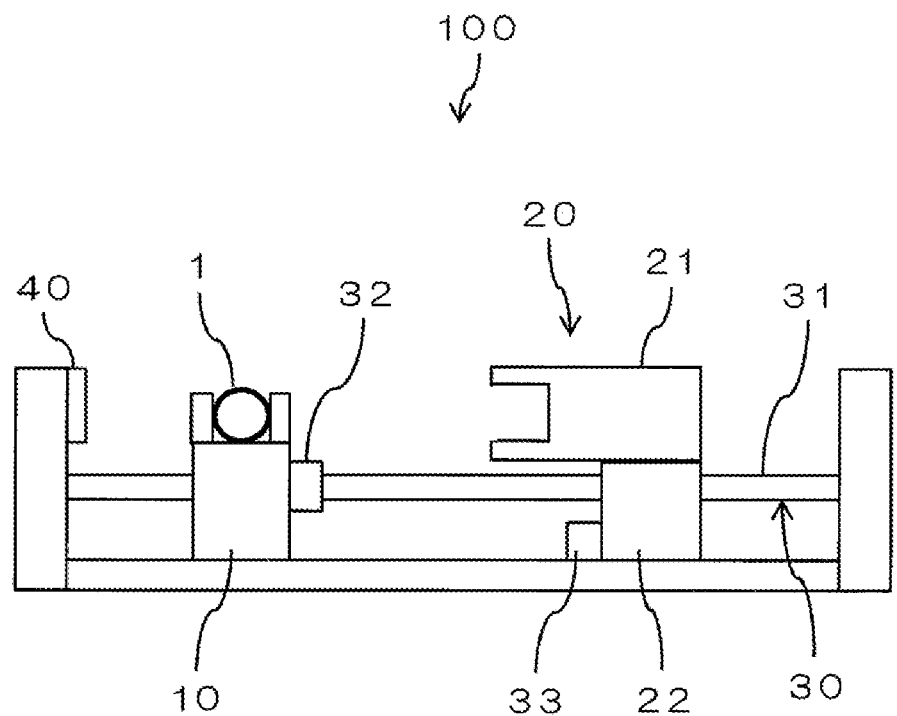
FIG. 2G is a side view of the heating mechanism corresponding to FIG. 1G.

Then, the support shaft 31 is rotated, and thus the nut 32 moves to the tube heating unit 20 side in a state where the nut 32 is coupled to the tube holding unit 10. Accordingly, the tube holding unit 10 gradually approaches the tube heating unit 20 side along the support shaft 31. When the tube holding unit 10 has moved to the initial position (attachment and detachment position of the sample tube 1) as illustrated in FIGS. 1G and 2G, rotation of the support shaft 31 is stopped (step S118). Then, the sample tube 1 is removed from the tube holding unit 10. The next sample tube 1 is set in the tube holding unit 10 as necessary, and the above-described processing is repeated again.

4. Operation and Effect (1) In the present embodiment, by moving the nut 32 which can be attached to and detached from the tube holding unit 10 and the tube heating unit 20, the tube holding unit 10 and the tube heating unit 20 can be separately moved. That is, it is not necessary to provide a mechanism for moving the tube heating unit 20 separately from the mechanism for moving the tube holding unit 10. It is possible to separately move the tube holding unit 10 and the tube heating unit 20 with a simple configuration of using the common nut 32.

(2) In addition, in the present embodiment, it is possible to separately move the tube holding unit 10 and the tube heating unit 20 on a straight line, by using the common nut 32 supported by the support shaft 31 extending in the straight line. Therefore, it is possible to separately move the tube holding unit 10 and the tube heating unit 20 with a simple configuration in which the nut 32 is supported by the support shaft 31.

(3) Particularly, in the present embodiment, the nut 32 including the magnet can be coupled to each of the tube holding unit 10 and the tube heating unit 20 due to magnetic force. Therefore, it is possible to separately move the tube holding unit 10 and the tube heating unit 20 with a simple configuration of using the magnet.

(4) In the present embodiment, as illustrated in FIGS. 1C and 2C, since the stopper 33 restricts movement of the tube holding unit 10, it is possible to reliably stop the tube holding unit 10 at the position where the sample tube 1 comes into contact with the tube heating unit 20. As illustrated in FIGS. 1D and 2D, by rotating the support shaft 31 to move the nut 32 to the tube heating unit 20 side in a state where the stopper 33 stops movement of the tube holding unit 10, the nut 32 can be separated from the tube holding unit 10. Therefore, the nut 32 can be easily and reliably attached to and detached from the tube holding unit 10.

(5) At that time, in association with movement of the nut 32 to the tube heating unit 20 side, the nut 32 separates the tube heating unit 20 from the tube holding unit 10. Thus, the tube heating unit 20 can be separated from the tube holding unit 10 by using the nut 32 which separates from the tube holding unit 10. Therefore, with a simple configuration of only moving the nut 32, the tube holding unit 10 which moves to the tube heating unit 20 side can be reliably stopped at the position where the sample tube 1 comes into contact with the tube heating unit 20, and then the tube heating unit 20 can be separated from the tube holding unit 10. Therefore, as illustrated in FIGS. 1D and 2D, since the sample tube 1 can be cooled in a state where the tube heating unit 20 is separated from the sample tube 1, cooling time of the sample tube 1 can be shortened.

(6) In addition, in the present embodiment, as illustrated in FIGS. 1E and 2E, since the stopper 33 restricts movement of the tube heating unit 20, it is possible to reliably stop the tube heating unit 20 at a position where the sample tube 1 comes into contact with the tube heating unit 20. As illustrated in FIGS. 1F and 2F, by rotating the support shaft 31 to move the nut 32 to the tube holding unit 10 side in a state where the stopper 33 stops movement of the tube heating unit 20, the nut 32 can be separated from the tube heating unit 20. Therefore, the nut 32 can be easily and reliably attached to and detached from the tube heating unit 20.

(7) At that time, in association with movement of the nut 32 to the tube holding unit 10 side, the nut 32 separates the tube holding unit 10 from the tube heating unit 20. Thus, the tube holding unit 10 can be separated from the tube heating unit 20 by using the nut 32 which separates from the tube heating unit 20. Therefore, with a simple configuration of only moving the nut 32, the tube heating unit 20 which moves to the tube holding unit 10 side can be reliably stopped at the position where the sample tube 1 comes into contact with the tube heating unit 20, and then the tube holding unit 10 can be separated from the tube heating unit 20.

5. Modification

In the above embodiment, a case has been described where a first stopper which restricts movement of the tube holding unit 10 and a second stopper which restricts movement of the tube heating unit 20 are configured of the common stopper 33. However, the present invention is not limited to the above configuration, and the first stopper and the second stopper may be separately provided.

In addition, in the above embodiment, a configuration has been described in which the connecting member which can be attached to and detached from the tube holding unit 10 and the tube heating unit 20 is configured of the nut 32 including the magnet, and the nut 32 moves on a straight line in association with rotation of the support shaft 31. However, the present invention is not limited to such a configuration. The connecting member may be attached to and detached from the tube holding unit 10 and the tube heating unit 20 by means other than the magnetic force such as suction force. In addition, the present invention is not limited to a configuration in which the connecting member moves on a straight line in association with rotation of the support shaft 31. The connecting member may move in any manner as long as the connecting member can be attached to and detached from both the tube holding unit 10 and the tube heating unit 20.

DESCRIPTION OF REFERENCE SIGNS

1 sample tube
2 cap
3 pipe
10 tube holding unit
20 tube heating unit
21 heater block
22 support base
30 movement mechanism
31 support shaft
32 nut
33 stopper
34 motor
40 pressing unit
50 control unit
60 flow controller
70 valve
80 cap attaching and detaching mechanism
90 cooling fan
100 heating mechanism

The invention claimed is:

1. A sample introduction device for heating a sample tube which contains a sample to desorb a sample component and to introduce the sample component to an analyzing unit, the device comprising:
a tube holding unit which holds the sample tube;
a tube heating unit which comes into contact with the sample tube held in the tube holding unit and heats the sample tube to desorb the sample component in the sample tube; and
a movement mechanism to which the tube holding unit and the tube heating unit are attached such that the tube holding unit and the tube heating unit can move separately, wherein
the movement mechanism includes
a connecting member which can be attached to and detached from the tube holding unit and the tube heating unit, and
a support portion which supports the connecting member such that the connecting member can move.

2. The sample introduction device according to claim 1, wherein
the support portion includes a support shaft which extends in a straight line, and
the connecting member is supported by the support shaft such that the connecting member can move on a straight line along the support shaft.

3. The sample introduction device according to claim 1, wherein the connecting member includes a magnet which can be attached to and detached from the tube holding unit and the tube heating unit due to magnetic force.

4. The sample introduction device according to claim 1, wherein the movement mechanism includes a first stopper which separates the connecting member from the tube holding unit by restricting movement of the tube holding unit at a position where the sample tube comes into contact with the tube heating unit when the connecting member moves from a tube holding-unit side to a tube heating-unit side in a state where the connecting member is coupled to the tube holding unit.

5. The sample introduction device according to claim 4, wherein when the first stopper causes the connecting member to be separated from the tube holding unit, the connecting member separates the tube heating unit from the tube holding unit in association with movement of the connecting member to the tube heating-unit side.

6. The sample introduction device according to claim 1, wherein the movement mechanism includes a second stopper which separates the connecting member from the tube heating unit by restricting movement of the tube heating unit at a position where the sample tube comes into contact with the tube heating unit when the connecting member moves from a tube heating-unit side to a tube holding-unit side in a state where the connecting member is coupled to the tube heating unit.

7. The sample introduction device according to claim 6, wherein when the second stopper causes the connecting member to be separated from the tube heating unit, the connecting member separates the tube holding unit from the tube heating unit in association with movement of the connecting member to the tube holding-unit side.

\* \* \* \* \*